United States Patent Office 3,594,293
Patented July 20, 1971

3,594,293
IRRADIATION PROCESS FOR REDUCING THE MOLECULAR WEIGHT OF POLYOXYMETHYLENE AND THEREBY INCREASING THERMAL STABILITY
Nelson Samuel Marans, Silver Spring, Md., assignor to W. R. Grace & Co., New York, N.Y.
No Drawing. Continuation-in-part of abandoned application Ser. No. 476,727, Aug. 2, 1965. This application May 24, 1968, Ser. No. 731,734
Int. Cl. C08d 1/00; C08f 1/16
U.S. Cl. 204—159.21                                        4 Claims

ABSTRACT OF THE DISCLOSURE

A process for rendering polyoxymethylene polymers and copolymers thermally stable while simultaneously reducing their molecular weights. Polyoxymethylene of a high molecular weight is subjected to ionizing radiation of about 0.000015–5 mev. at a dosage of about 0.01 to 2.0 megarads. The irradiated polymer has a much greater thermal stability than the non-irradiated polymer, as well as a substantially reduced molecular weight.

---

This application is a continuation-in-part of my copending application Ser. No. 476,727, filed Aug. 2, 1965 and now abandoned, which was in turn a continuation-in-part of Ser. No. 152,645 filed Nov. 15, 1961, now abandoned.

This invention is directed to polyoxymethylene and related polymers. More specifically, this invention is directed to a process for preparing thermally stable polyoxymethylene and related polymers having reduced molecular weights.

Heretofore, there has been much activity in the field of polymerizing oxymethylene compounds such as formaldehyde, paraformaldehyde, and trioxane. The art has been refined to the point where relatively high yields of polymer can easily be obtained. However, it is frequently found that accurate molecular weight control is difficult to maintain.

Variations in molecular weights of polymers can cause serious fabrication problems, particularly when the molecular weight is so high that the polymer becomes difficult to flow. In the case of polyoxymethylene, difficulty in flowing is encountered when the reduced specific viscosity of the polymer in $\gamma$-butyrolactone at 135° C. (hereinafter referred to as RSV) exceeds about 1.00 dl./g.

A further disadvantage of prior art polyoxymethylene is its relatively poor thermal stability. Kern et al. (Makromol. Chem. 40, 101 (1960), pp. 103–105) show that thermal decomposition starts at the chain ends at a temperature below about 100° C. and that with higher molecular weight polyoxymethylene at somewhat higher temperatures appreciable cleaveage of formaldehyde occurs. Hence Kern et al. have demonstrated and reported the relative instability of polyoxymethylene and the ease with which said polymer degrades thermally.

I have discovered a means of circumventing the aforementioned problems of high molecular weight and thermal instability, wherein said means is both very rapid and economical. I have made the surprising discovery that by forming a high polymer of formaldehyde, paraformaldehyde, or trioxane and irradiating said polymer under carefully controlled conditions, that the molecular weight can be substantially reduced while the thermal stability of the reduced molecular weight polymer is substantially improved over that of the original high polymer.

It is therefore an object of this invention to provide a process for improving polyoxymethylene and related polymers.

It is a further object of this invention to provide a process for thermally stabilizing polyoxymethylene and related polymers.

It is a further object of this invention to provide a process for preparing polyoxymethylene in the fibrous form having a reduced molecular weight.

It is a further object of this invention to provide a method for simultaneously reducing the molecular weight of, and thermally stabilizing polyoxymethylene and related polymers.

These and other objects and advantages of this invention will become apparent from the following detailed description and examples.

In summary, this invention is directed to a method for preparing polymer having a reduced specific viscosity of about 0.25–1.5 dl./g. and being thermally stable up to about 200° C., said method comprising:

(a) Polymerizing a monomer selected from the group consisting of formaldehyde, paraformaldehyde, and trioxane to form a first polymer having an RSV of about 1.00–6.00 dl./g.;

(b) Subjecting said first polymer to about 0.01–2.0 megarads of ionizing radiation while maintaining the temperature of said polymer at about 0–35° C. to form a product polymer, said polymer having an RSV of about 0.25–1.5 dl./g.; and (c) Recovering said product polymer.

In a preferred embodiment, this invention is directed to the process as set forth in the summary, supra, wherein said first polymer is subjected to said radiation while said polymer is in an inert atmosphere.

In still another preferred embodiment, this invention is directed to the process as set forth in the summary, supra, wherein said first polymer is subjected to said radiation while said polymer is in an evacuated atmosphere at a pressure of 0.01–15.0 mm. of Hg.

It is generally known that high energy irradiation will degrade many polymeric materials. While this degradation leads to a general reduction in molecular weight, the molecular weight reduction is ordinarily attendant with drastic effect on the physical properties of the irradiated polymer. It is been disclosed in the prior art that polymers such as polyisobutylene, butyl rubber, Lucite (acrylic resin) and Teflon (fluorohydrocarbon resin) undergo drastic reduction of physical properties when subjected to only a small amount of irradiation.

Continuing to the general belief that synthetic organic polymers undergo drastic and detrimental changes when subjected to degrading amounts of high energy irradiation, I have made the surprising discovery that not only may be high molecular weight polyoxymethylene polymers contemplated herein be beneficially irradiated to obtain polymers having a precisely controlled molecular weight; but also that when said polymers are irradiated by the processes described herein not only do said polymers not undergo drastic and detrimental changes in their physical properties, but that their thermal stability is in fact greatly enhanced. In other words, I have found that polyoxymethylene unlike other synthetic organic polymers may undergo irradiation-induced chain scissioning without undergoing uncontrolled degradation which results in drastic loss of desirable physical properties. In fact by subjecting said polymers to irradiation by the process contemplated herein the inherent physical properties of said polymer are enhanced rather than degraded, e.g., the thermal stability of these polymers is greatly improved.

Polymerization of formaldehyde, paraformaldehyde, and trioxane to a high polymer of RSV of 1.00 dl./g. or greater as contemplated herein can be accomplished by any of the many addition polymerization methods apparent to those skilled in the art. Said reaction may be carried out in the gaseous, liquid, or solid phase and can be induced by acidic and basic catalyst, and by irradiation such as high energy electrons, gamma rays, protons, alpha particles, and neutrons as produced by any convenient source.

Irradiation of polyformaldehyde as contemplated herein means subjecting the polyformaldehyde to high energy radiation of from 0.000015 to 5 mev. at a dosage of about 0.01–2.0 megarads. While being irradiated, the polyoxymethylene may be maintained in any noncorrosive atmosphere, such as air, helium, nitrogen, etc. Preferably, said non-corrosive atmosphere is an inert atmosphere such as helium, argon, and nitrogen or an evacuated atmosphere at a pressure of about 0.1–1000 mm. Hg.

This invention is adaptable to use with any of the irradiating means presently known or contemplated by those skilled in the art of irradiation. Among those sources of radiation are high energy electrons, gamma rays, protons, alpha particles and neutrons. Preferably, the source of irradiation is high energy electrons.

It is not necessary to conduct the instant process while the polyoxymethylene is at an elevated temperature. Under ideal circumstances the temperature is maintained at about 0–35° C. thus keeping said temperature below the melting point of said polymer.

The following examples are provided to further point out the various aspects of the instant invention, but are not to be interpreted or construed as limiting said invention.

EXAMPLE 1

A series of samples of polyoxymethyelne obtained by irradiating trioxane and having a reducer specific viscosity in gamma-butyrolactone at 135° C. of 1.54 dl./g. were placed in evacuated tubes under a pressure of 0.3 mm. Hg. These sealed samples were then subjected to varying amounts of high energy irradiation, said irradiation being produced by a Van de Graaff electron accelerator which produced 2 mev. electrons. The irradiation was delivered at a rate of 0.5 megarad per pass for the first two passes and 1.0 magarad per pass for all subsequent passes. In all cases the RSV's were determined in gammabutyrolactone at 135° C. The results tabulated below indicate that a reduced specific viscosity ranging from the original 1.54 down to 0.14 may be obtained by varying the irradiation dose from 0.5 to 6.0 megarads.

| Dose (mr.): | RSV (dl./g.) |
|---|---|
| 0.0 | 1.4 |
| 0.5 | 0.47 |
| 1.0 | 0.29 |
| 2.0 | 0.25 |
| 4.0 | 0.14 |
| 6.0 | 0.14 |

EXAMPLE 2

The procedure of Example 1 was followed using a commercially available sample of polyoxymethylene, Du Pont Delrin 150. To determine the thermal stability of the reduced molecular weight polymer, the irradiated samples were heated to a temperature of about 200° C., at which temperature said polymer samples were completely molten, and were maintained at said temperature for a period of about 10 minutes. The RSV's of the heated and unheated irradiated samples were then compared. The results obtained are presented in the following table:

| Dose (mr.): | RSV (dl./g.) | |
|---|---|---|
| | Melted | Unmelted |
| 0.1 | 0.89 | 0.87 |
| 0.25 | 0.84 | 0.86 |
| 0.50 | 0.75 | 0.74 |
| 0.75 | 0.65 | 0.65 |
| 1.0 | 0.61 | 0.55 |
| 1.5 | 0.50 | 0.53 |

EXAMPLE 3

The procedure of Example 1 was followed using commerical samples of polyoxymethylene, Du Pont Delrin 500. The table below illustrates that the RSV of the polymer may be decreased from 0.67 to 0.28 by varying the amount of the irradiating dosage.

| Dose (mr.): | RSV (dl./g.) |
|---|---|
| 0.0 | 0.67 |
| 0.5 | 0.61 |
| 1.0 | 0.53 |
| 2.0 | 0.40 |
| 4.0 | 0.36 |
| 6.0 | 0.28 |

I claim:
1. A method for preparing polyoxymethylene, said polymer having an RSV of 0.25–1.5 dl./g. and being thermally stable up to about 200° C., said method comprising:
  (a) subjecting a first polyoxymethylene polymer which has been formed by polymerizing a monomer selected from the group consisting of formaldehyde, paraformaldehyde, and trioxane and having an RSV of about 1.00–6.00 dl./g., to a dose of ionizing radiation of about 0.01–2.0 megarads while maintaining the temperature of said polyoxymethylene polymer at about 0–35° C., to decrease the RSV of said first polyoxymethylene polymer and form a second polyoxymethylene polymer having an RSV of about 0.25–1.5 dl./g.; and
  (b) recovering said second polymer.
2. The method of claim 1 wherein said first polymer is subjected to said radiation while said polymer is in an inert atmosphere.
3. The method of claim 2 wherein said first polymer is subjected to said radiation while said polymer is in an evacuated atmosphere at a pressure of about 0.01–15 mm. of Hg.
4. The method of claim 1 wherein the radiation dose is about 0.01–2.0 megarads.

References Cited

UNITED STATES PATENTS 3,242,063   3/1966   Okamura et al. ____ 204—159.21

OTHER REFERENCES

Bovey, The Effects of Ionizing Radiation on Natural and Synthetic High Polymers, Interscience Publishers (1958), pp. 73–80.

Kern et al., Angewandte Chemie., 73, No. 6, Mar. 21, 1961, pp. 1 and 5. (Page 19 of translation.)

SAMUEL H. BELCH, Primary Examiner
R. B. TURER, Assistant Examiner

U.S. Cl. X.R.
260—67